(12) United States Patent
Lucas et al.

(10) Patent No.: US 6,557,584 B1
(45) Date of Patent: May 6, 2003

(54) FLOW CONTROL AND FLOW RATE CONTROL MECHANISMS FOR USE IN BREWING MACHINES WITH FLUIDLY CONNECTED CHAMBERS

(75) Inventors: Eric E. Lucas, Bedford Heights, OH (US); Robert C. Cheich, Seven Hills, OH (US); Mark V. Gorjanc, Chesterland, OH (US); Marc L. Vitantonio, S. Russell, OH (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 09/263,015

(22) Filed: Mar. 5, 1999

Related U.S. Application Data (62) Division of application No. 08/889,224, filed on Jul. 8, 1997, now Pat. No. 5,901,635.

(51) Int. Cl.[7] ............... F16K 11/20; F16K 31/528; A47J 31/46
(52) U.S. Cl. ............... 137/613; 99/299; 99/305; 222/545; 251/122; 251/263; 251/341; 251/347; 251/349; 251/251
(58) Field of Search ............... 99/300, 304, 307, 99/281, 295, 299, 305; 251/120, 121, 251, 252, 263, 341, 342, 347, 349, 122; 137/613, 637; 222/506, 545, 146.2, 146.5, 544, 556, 558

(56) References Cited

U.S. PATENT DOCUMENTS

| 1,802,897 A | * | 4/1931 | Holden et al. ............... 251/121 |
| 2,035,202 A | * | 3/1936 | Smith ........................... 251/122 |
| 3,450,024 A | * | 6/1969 | Martin ........................... 99/295 |
| 3,595,445 A | * | 7/1971 | Buford et al. ............... 251/342 |
| 3,878,360 A | * | 4/1975 | Augustine et al. ............ 99/281 |
| 4,015,631 A | * | 4/1977 | Hayes ........................... 251/252 |
| 4,467,707 A | * | 8/1984 | Amiot ........................... 99/299 |
| 4,475,566 A | * | 10/1984 | Haines ........................ 137/68.3 |
| 4,532,954 A | * | 8/1985 | Fillman ....................... 137/302 |
| 4,601,310 A | * | 7/1986 | Phillips ....................... 251/122 |
| 4,614,859 A | * | 9/1986 | Beckering et al. ............ 99/281 |
| 4,616,805 A | * | 10/1986 | Haas ........................... 251/252 |
| 4,720,076 A | * | 1/1988 | Hyde ........................... 251/122 |
| 4,805,523 A | * | 2/1989 | Stuckey et al. ............... 99/299 |
| 4,888,466 A | * | 12/1989 | Hoffmann .................... 99/307 |
| 4,969,392 A | * | 11/1990 | Steele et al. .................. 99/299 |
| 5,025,714 A | * | 6/1991 | Brewer ........................ 99/300 |

*Primary Examiner*—George L. Walton
(74) *Attorney, Agent, or Firm*—Lawrence J. Shurupoff (57) ABSTRACT

A brewing machine with brewing water flow control mechanisms for controlling flow between chambers, includes a filling chamber in fluid connection with a heating reservoir. In one aspect of the invention, a control chamber with a sealable opening is formed about a drain hole in the filling chamber so that water must flow through the control chamber to reach the reservoir, and fluid access to the control chamber is controlled by a seal which engages the opening in the control chamber. Engagement of the seal with the opening in the control chamber is controlled by operation of a lid which covers the filling chamber. In another aspect of the invention, a flow rate control valve assembly is at least partially housed within the control chamber and has a portion which is proximate to the drain hole in the filling chamber connected to the reservoir, whereby a rate of flow from the filling chamber to the reservoir is selectively controllable by adjustment of the flow rate control valve. In another aspect of the invention, flow rate control mechanisms which work in conjunction with the showerhead which distributes brewing water over a brewing material in a brewing chamber are provided. The flow control and flow rate control structures and mechanisms of the invention are applicable to any device having at least two fluid chambers wherein controlled flow between the chambers is required.

12 Claims, 11 Drawing Sheets

U.S. PATENT DOCUMENTS

| | | | | |
|---|---|---|---|---|
| 5,142,610 A | * | 8/1992 | Augustine et al. | 251/350 |
| 5,231,918 A | * | 8/1993 | Grzywna | 99/299 |
| RE34,382 E | * | 9/1993 | Newnan | 99/289 R |
| 5,251,541 A | * | 10/1993 | Anson et al. | 99/299 |
| 5,337,775 A | * | 8/1994 | Lane et al. | 137/68.29 |
| 5,367,948 A | * | 11/1994 | Di Fusco et al. | 99/289 R |
| 5,377,299 A | * | 12/1994 | Anson et al. | 99/281 |
| 5,390,832 A | * | 2/1995 | Lombardo | 251/122 |
| 5,531,037 A | * | 7/1996 | Pons et al. | 251/208 |
| 5,619,904 A | * | 4/1997 | Di Nunzio et al. | 99/299 |
| 5,699,719 A | * | 12/1997 | Lucas et al. | 99/299 |

* cited by examiner

FLOW CONTROL AND FLOW RATE CONTROL MECHANISMS FOR USE IN BREWING MACHINES WITH FLUIDLY CONNECTED CHAMBERS

This application is a division of prior application Ser. No. 08/889,224 filed on Jul. 8, 1997 now U.S. Pat. No. 5,901,635.

FIELD OF THE INVENTION

The present invention pertains generally to flow control structures and mechanisms and, more particularly, to control of water flow between fluidly connected chambers of automated brewing machines.

BACKGROUND OF THE INVENTION

Automated brewing machines such as coffee and tea makers typically have a brewing water reservoir wherein water is heated by a heating element inside of or in contact with the reservoir. Heated water is then transferred from the reservoir, typically by thermal expansion or displacement, to a brewing chamber or basket which holds a brewing material such as coffee grounds or tea leaves, through which the heated water flows to produce a brewed beverage which drains into a carafe or pitcher positioned underneath the brewing chamber.

The rate of flow of heated water through the brewing material in the brewing chamber directly affects the content and taste of the brewed beverage. For example, a relatively fast rate of flow of hot water through coffee grounds in the brewing chamber will result in relatively diluted coffee with relatively less flavor and caffeine, than is produced by a slower rate of flow. And to correctly brew decaffeinated coffee grounds, a relatively slower rate of flow should be used in order to achieve a taste comparable to "regular" or caffeinated coffee which is brewed with a relatively faster rate of flow. In a displacement style brewing machine, the rate at which the heated water flows into the brewing chamber is primarily a function of the rate at which water is introduced to the reservoir, the size of the conduit or passage between the reservoir and the brewing chamber, and the size of holes in a water distributor or showerhead over the brewing chamber. The rate of flow through the brewing chamber is also a function of the size of the drainage hole at the bottom of the basket. These dimensions are typically fixed, leaving no practical means for adjusting the rate of flow for brewing different types of beverages.

Some attempts have been made to enable adjustment of flow rate by, for example, providing an adaptable, interchangeable showerhead with different hole sizes; but this approach is cumbersome, labor-intensive, and dependent upon availability of the part or parts to be interchanged. Reduced-opening showerheads may not provide optimal water distribution over the brewing material in the brewing chamber. Furthermore, showerhead flow rate adjustment does not address the rate of flow into the reservoir.

Another operational difficulty associated with automated brewing machines is that the brewing cycle, i.e., the heating of water in the reservoir and flow through and out of the brewing chamber, may commence immediately upon introduction of additional water into the reservoir. This is especially the case in the well-known displacement type brewing machine, wherein a charge of hot brewing water sits in wait in the reservoir to be displaced into the brewing basket immediately upon introduction of additional water from a separate filling chamber connected to the reservoir. This necessitates that a carafe or pitcher be positioned underneath the brewing chamber as water is added to the filling chamber. Thus a second pitcher is needed to measure and pour water into the reservoir. The requirement of a separate filling pitcher is burdensome, especially in the context of machines designed primarily for domestic use.

U.S. Pat. No. 5,251,541 describes a displacement type brewing machine wherein a stopper directly engages a fill port between a fill basin and a heating reservoir when water is being added to the fill basin. The stopper is connected to one end of a pivotal arm. The other end of the pivotal arm may be contacted by a cam on a shaft which depends from a lid selectively covering an opening to the fill basin. When the lid is in the closed position, the cam on the shaft contacts the other end of the arm to thereby pivot that arm and lift the stopper out of engagement with the fill port, allowing water to drain through the fill port into the reservoir. When the lid is opened by swinging it to the side, the cam is moved out of contact with the arm, allowing the arm to pivot in the opposite direction so that the stopper directly engages and covers the fill port. While this structure accomplishes suspension of the brewing cycle until the lid on the fill tray is closed, it does not allow any variable rate flow control mechanism to be incorporated into or associated with the fill port, as the stopper must be positioned directly over the fill port.

SUMMARY OF THE PRESENT INVENTION

The present invention overcomes these and other disadvantages of the prior art by providing an automated brewing machine having multiple brewing water flow control mechanisms which control commencement of a brewing cycle and which control the rate of brewing water flow and ultimately the rate of brewing and the resultant content and taste of brewed beverages, such as caffeinated or decaffeinated coffee.

In accordance with one aspect of the invention, there is provided an automated brewing machine for brewing a quantity of brewed beverage by directing a flow of heated water over a brewing material, the brewing machine having a reservoir for holding brewing water and a heating element in thermal communication with the reservoir for heating brewing water within the reservoir; a filling chamber which is fluidly connected to the reservoir whereby water in the filling chamber can flow into the reservoir, and an adjustable flow rate control valve assembly between the filling chamber and the reservoir, whereby a rate of flow of water from the chamber to the reservoir can be adjusted, and a brewing chamber fluidly connected to the reservoir.

In accordance with another aspect of the invention, there is provided a brewing machine for preparing a brewed beverage by establishing a flow of heated water through a brewing material, the machine having a filling chamber for initially receiving brewing water into the machine, the filling chamber having a cover with an openable lid; a heating reservoir fluidly connected to a hole in the filling chamber through which water in the filling chamber enters the reservoir, and a heat source in thermal communication with the heating reservoir; a control chamber which surrounds the hole in the filling chamber, and a movable seal engageable with an opening in the control chamber which controls flow of water from the filling chamber to the reservoir.

In accordance with still another aspect of the invention, there is provided a controllable adjustable flow rate brewing device having multiple chambers including a filling chamber, a control chamber, a heating chamber and a brewing chamber. The control chamber is positioned above a drain hole which provides a fluid connection between the control chamber and the heating chamber. The control chamber has an opening between the control chamber and the filling chamber. A seal is engageable and disengageable with the control chamber opening and is activated by a lid which covers the filling chamber. A flow rate control valve at least partially within the control chamber is operative to control a rate of flow through the drain hole and into the heating chamber.

In accordance with still another aspect of the invention, a flow rate control valve for selecting the brewing cycle and water flow rate through the system has an easily accessible dial for ready selection by the user. This flow rate control valve can also be adapted to have an additional fill position in which the drain is closed by the valve when water is added to the filling chamber.

And in accordance with still another aspect of the invention, brewing chamber showerhead flow control rate assemblies are provided which enable adjustment of the flow rate of brewing water through a showerhead which distributes heated brewing water into a brewing chamber which holds a brewing material. The showerhead flow rate control assemblies can be employed in combination with the other flow control and flow rate control mechanisms of the invention.

These and other aspects of the present invention are herein described in particularized detail with reference to the accompanying Figures.

BRIEF DESCRIPTION OF THE FIGURES

In the accompanying Figures:

FIGS. 11A–11D illustrate an alternate embodiment of an adjustable flow rate brew basket showerhead of the invention.

DETAILED DESCRIPTION OF PREFERRED AND ALTERNATE EMBODIMENTS

Although the various aspects of the invention are described in the context is of one particular type of brewing machine, specifically a displacement type brewing machine, it is understood that the basic concepts and principles of the invention are applicable to other types of brewing machines and other types of machines and devices having two or more fluid flow connected chambers wherein control of flow and rate of flow of fluid between the chambers is desired.

Figure 1:
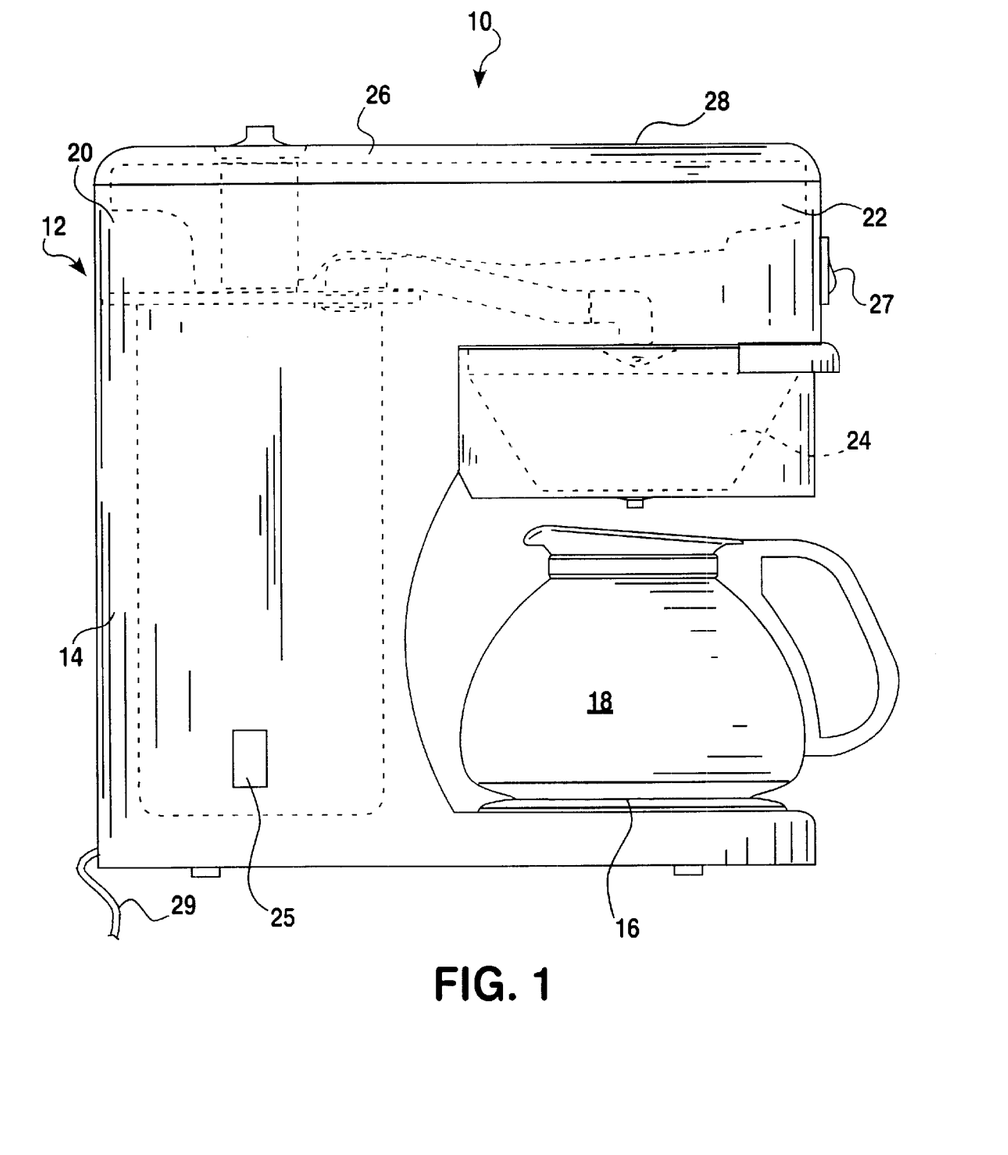
FIG. 1 is an external side elevation of an automated brewing machine constructed in accordance with the present invention.

FIG. 1 illustrates an automated brewing machine, indicated generally at 10. The brewing machine includes a body 12, a base 14 and a superstructure 20. The base includes a plate 16 for supporting a pitcher or carafe 18. As further described below, the plate 16 may be heated to transfer heat to a brewed beverage contained in a pitcher thereon. The superstructure 20 has a cantilevered forward section 22 which extends over the plate 16 and supports a brewing chamber 24 disengageable from the forward section 22. A cover 26 is attached to the top of the superstructure 20, and has formed therein an opening covered by a hinged dust lid 28, as further described below. A main power control switch 25 is mounted to the body and acts as master switch for the entire circuitry of the machine, including a heating element in a heated water brewing water reservoir inside the body, and a reservoir keep warm heater in the form of a foil pad heater attached to the exterior of the reservoir. A separate switch 27 controls power to the warming plate 16. A power cord 29, connected to a power control circuit housed within the body 12, exits from the rear of the body.

Figure 2:
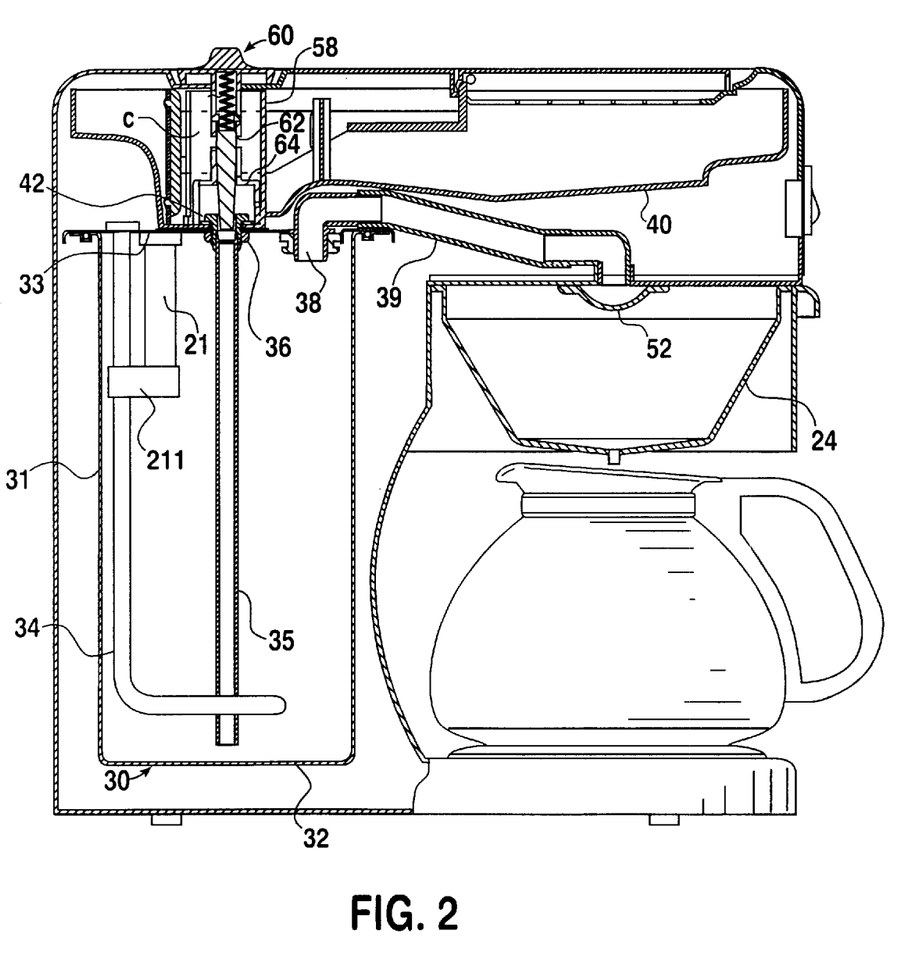
FIG. 2 is a cross-sectional side elevation of the automated brewing machine of FIG. 1.
Figure 3:
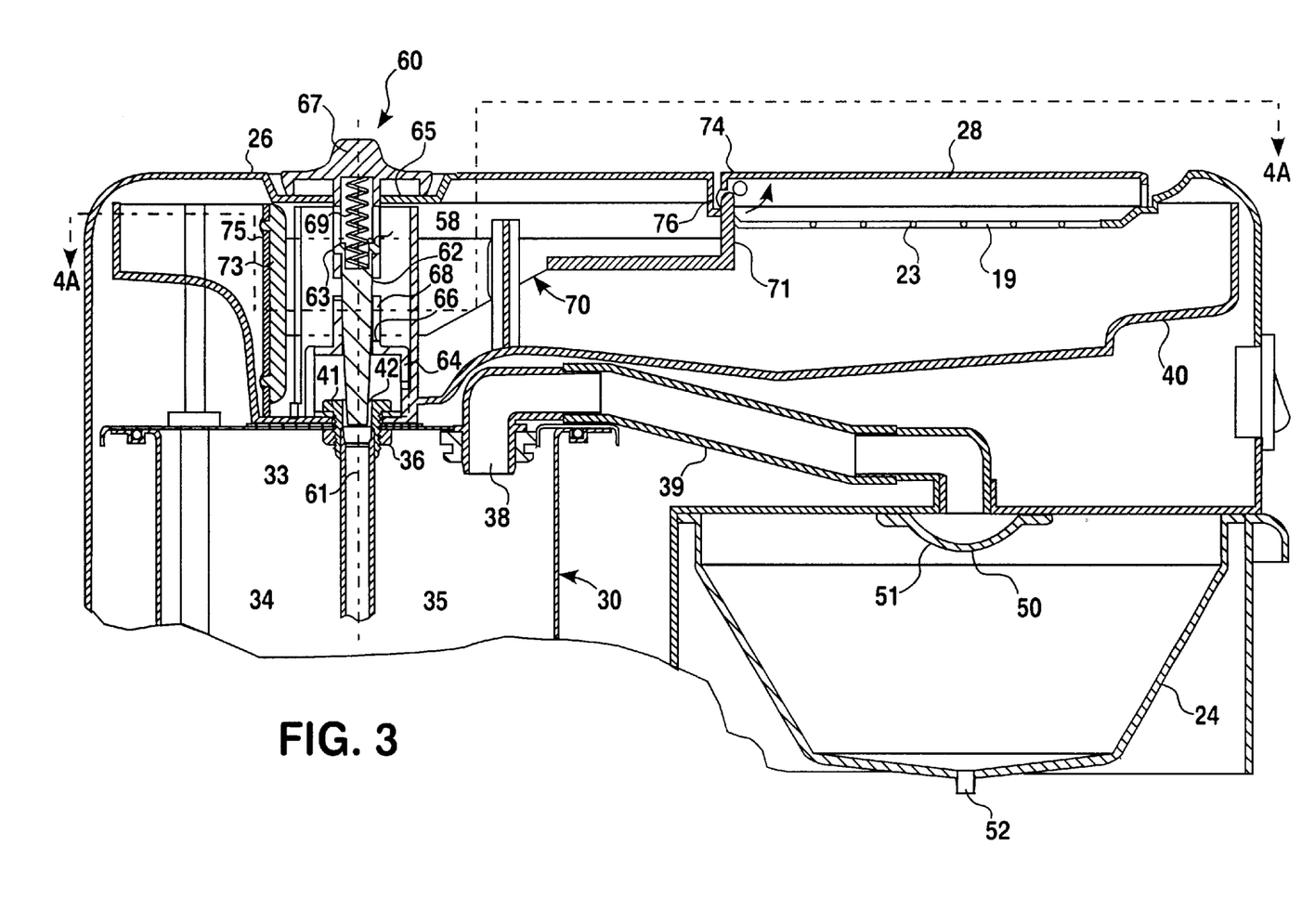
FIG. 3 is an enlarged cross-section of an upper portion of the automated brewing machine of FIG. 1.

As shown in FIG. 2, mounted within the body is a heated brewing water reservoir 30 which may be, for example, in the form of an aluminum or plastic or stainless steel tank with side walls 31, a bottom wall 32 and a top wall 33. A heating element 34 is mounted within the reservoir 30 to heat water therein. The heating element 34 is a resistive element in a conventional AC circuit (not shown but positioned, for example in the bottom of base 14 and electrically connected to the heating element, the warming plate 16, and switches 25 and 27). A thermostat 21, connected in series to the heating element, is supported within the reservoir and directly attached by clip 211 to the heating element 34. The direct physical connection of the thermostat to the heating element by clip 211 provides the thermostat with an improved accuracy read of the actual heating element temperature. This is advantageous to insure power interruption when the heating element reaches the thermostat setting, as opposed to the water in the reservoir, at which point the heating element temperature actually exceeds the thermostat setting.

The reservoir 30 is filled from a filling chamber 40 supported by the superstructure 20 over the top of the reservoir and the brewing chamber 24. As shown in FIGS. 2–6, a drain fitting 41 fits within a drain hole 42 in the filling chamber which is fluidly connected to an opening in the top wall 33 of the reservoir. The drain fitting 41 may be in the form of a threaded fastener with a cylindrical bore therethrough. As shown in particular in FIGS. 5A–5C and 6A–6B, an upper end of a reservoir fill tube 35 is inserted into the lower end of the drain fitting 41 and permanently bonded therein by brazing or silver solder. A fill tube fitting 36, which may be in the form of a multiple threaded nut, is attached to the interior of the top wall 33 of the reservoir 30 about the drain hole to receive the external threads of the drain fitting 41. As shown in FIG. 6C, the drain tube fitting 36 may be alternatively configured to have external threads 365 to engage with internal threads in the upper end of the fill tube 35. And as shown in FIG. 6D, fitting 36 may alternatively be configured with a set screw hole 366 to receive a set screw 367 which secures the upper end of the fill tube to fitting 36.

A cold water reservoir fill tube 35 is centrally mounted within the reservoir (by connection of one end to drain fitting 41) to direct water introduced into the reservoir to the very bottom of the reservoir. Preferably, the bottom end of the fill tube 35 is positioned as close as possible to the bottom wall 32 of the reservoir, as shown in FIG. 2, so that cold water which enters the reservoir through the tube functions primarily to displace hot water out of the reservoir, while minimizing temperature drop in the heated water displaced out of the reservoir. Also, it is preferable that the inner diameter of the fill tube 35 be approximately equal to and not greater than the inner diameter of the drain hole. This reduces the cooling effect of the cold water passing through the fill tube upon heated water in the reservoir, thus producing a higher brewing temperature, i.e., the temperature of the heated water displaced from the reservoir.

Figure 8:
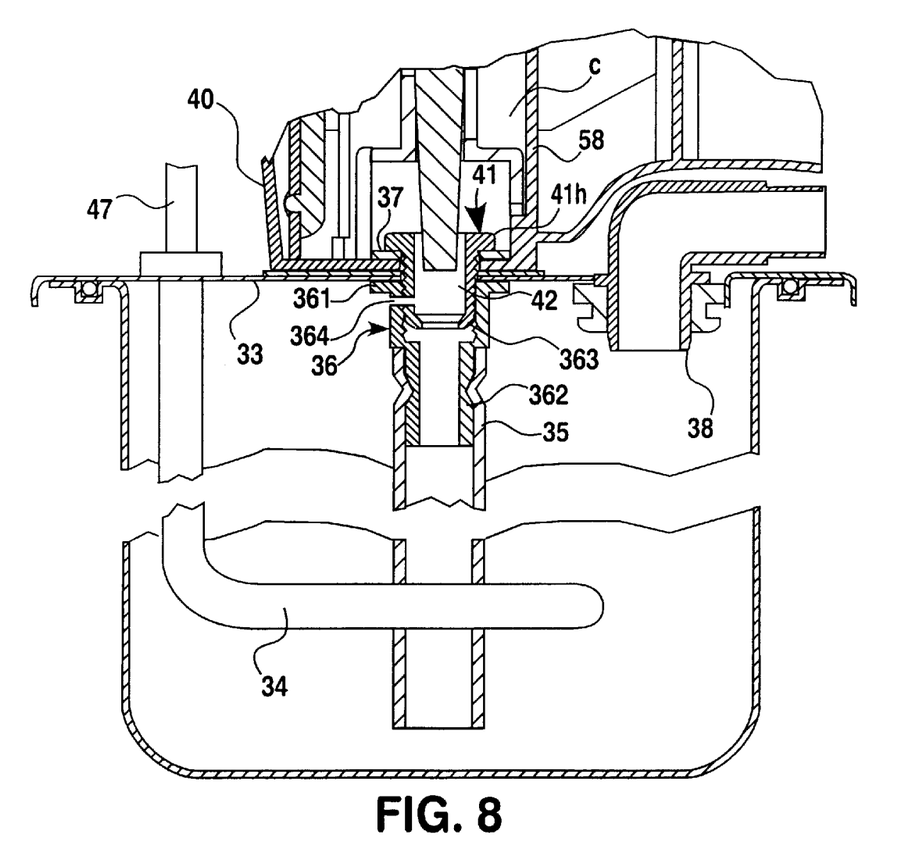
FIG. 8 is a cross-sectional view of a top portion of the water heating reservoir fluidly connected to a filling chamber.

As shown in FIG. 8, an alternate embodiment of the drain tube fitting 36 has a flange 361 attached to the interior side of the reservoir top by spot welding or other permanent or temporary bonding. The top end of the fill tube 35 is attached to a lower distal end 362 of fitting 36 by crimping or other suitable connection. Internal threads 363 are provided in fitting 36 to engage the external threads of the drain fitting 41. The floor of the filling chamber and top wall 33 of the reservoir, plus a seal 37 around the drain hole 42, are compressed between the head 41h of drain fitting 41 and flange 361 of the fill tube fitting 36. The fill tube fitting 36 of FIG. 8 further includes a vent 364 in the form of a bore through the wall of the fitting at a point just above the maximum water level within the reservoir (defined by the lowest point of exit port 38). Vent 364 thus provides an air passage from the top of the reservoir, out drain hole 42 into the filling chamber. Any excess gas pressure which is generated by cavitation which occurs during the rapid heating of water in the reservoir can escape through vent 364, rather than through exit port 38 to showerhead 50, which can produce an undesirable gurgling noise. Alternatively or in addition to vent 364, a separate vent stack 47 can be constructed to extend through the top wall of the reservoir, through the floor of the filling chamber, and to the top of the filling chamber to provide a similar function, as also shown in FIG. 2.

As shown in FIGS. 2–8 and further described below, a control chamber 58 with an opening therein is constructed within the filling chamber to surround the drain hole 42. The drain hole 42 is positioned at a lowest point within the filling chamber, so that as the filling chamber is filled with water, the water flows through the control chamber, through the drain hole, into the reservoir 30 through fill tube 35, displacing any water which is already in the reservoir out of the reservoir through a reservoir exit port 38, fluidly connected by conduit 39 to a showerhead 50 supported by an underside of the superstructure over the brewing chamber 24. Heated brewing water is distributed over brewing material in the brewing chamber through a plurality of drain holes 51 in the showerhead 50. The interior of the brewing chamber has inwardly angled walls configured to support a brewing filter, and a brewing chamber drain hole 52 through which brewed beverage exits directly into the carafe.

As shown in FIGS. 3, 5A–5C and 6A–6B, the rate of flow of water through the drain hole 42 into the reservoir 30 is controllable by a pin valve assembly (also referred to herein as a needle valve or flow rate control valve), indicated generally at 60, having a pin shaft 62 supported by a pin valve guide 64, held within a generally cylindrical sleeve 58 which defines the flow control chamber C which extends upward from the bottom floor of the filling chamber about drain hole 42. The flow control chamber C is, in this particular embodiment, formed by a generally cylindrical sleeve-type structure 58 which extends from the floor of the filling chamber to the cover 26, and has an opening 59 in the form of a slot which also extends from the floor of the filling chamber to the cover 26. The structure 58 is also referred to herein as the control chamber.

The pin shaft 62 is held in axial alignment with the drain hole 42 by the pin valve guide 64 within the control chamber 58. A valve stem 61 depends from the pin shaft 62. The pin shaft 62 may be generally cylindrical or tapered from one outer diameter at an upper end within the valve guide to a lesser outer diameter at a bottom distal end of the valve stem 61. Alternatively, the pin shaft may have a uniform diameter, and the valve stem taper from the upper end attached to the shaft to the bottom end. The inner diameter of the drain hole 42 can be selectively dimensioned relative to the outer diameters of the valve stem 61 in order to achieve the desired flow rates at any particular position of the pin shaft relative to drain hole 42, as further described below. For example, a tubular insert can be placed within the drain hole to reduce the size of the water flow passage. An opening 641 in the base portion of the pin valve guide 64, generally aligned with opening 59, allows water in the control chamber C to pass through the pin valve guide 64 and into the drain hole 42. Additional openings can be provided in the pin valve guide 64.

Figure 5A:
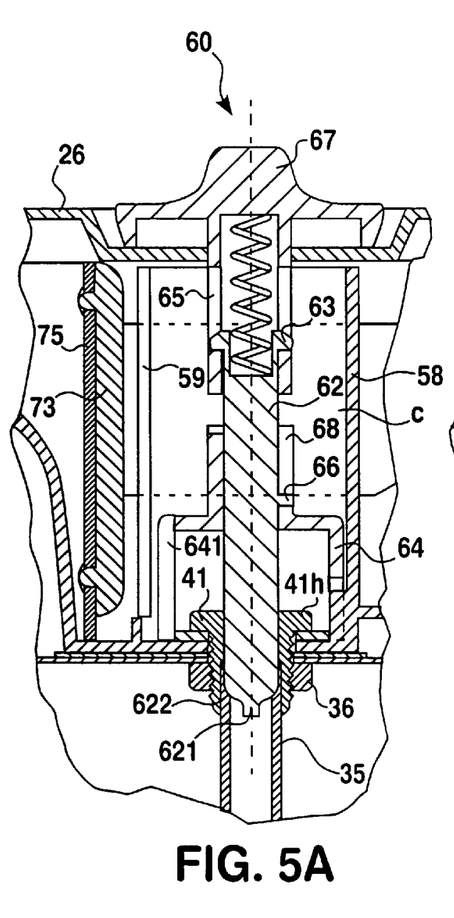
FIGS. 5A–5C are cross-sectional views of the brewing water flow rate control valve assembly of the invention, respectively showing the valve in different positions.
Figure 5B:
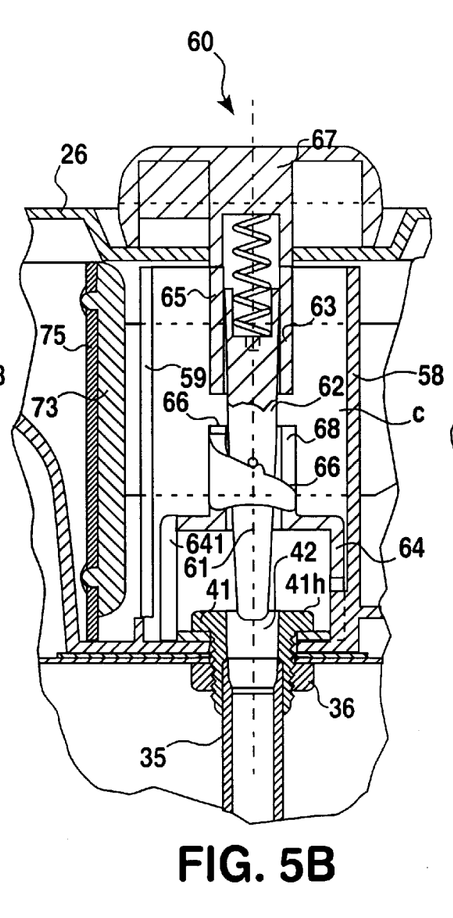
Figure 5C:
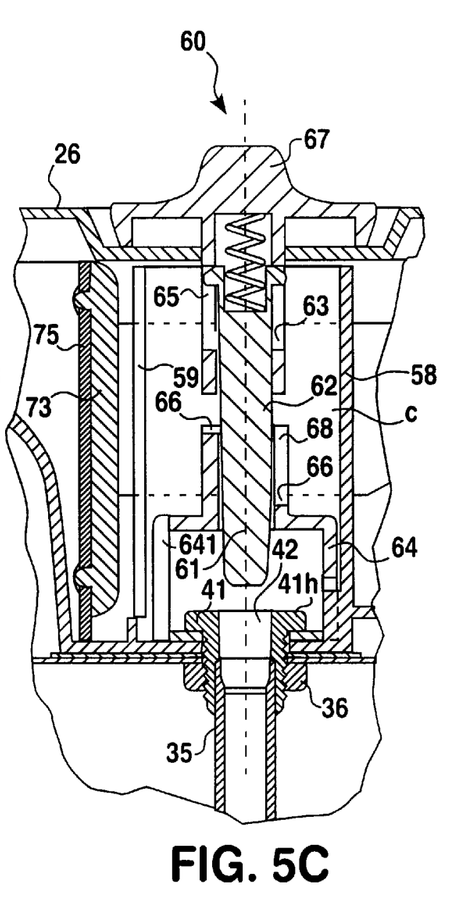

As best shown in FIGS. 5A–5C, two ears 63 extend laterally from the top end of pin shaft 62 and are received in diametrically opposed vertical slots in a downwardly extending boss 65 on a valve dial 67. The pin shaft 62, including the valve stem 61, is thereby precluded from rotating relative to dial 67 while being axially slidably received in the boss 65 extending downwardly from the dial 67. The dial 67 is rotatably mounted in a hole in cover 26. A cam follower 66 extends laterally from the pin shaft 62 (or alternatively from valve stem 61) to ride upon a helical cam 68 on a sleeve which extends upwardly from the base of the pin valve guide 64. A spring 69 between the upper end 61 of the pin shaft and the interior of the boss 65 biases the cam follower 66 against the cam 68.

With the valve in a fully open position (FIG. 5C), the cam follower 66 is located in a detent or flat near the top of the cam 68, and the valve stem 61 is in a retracted position relative to the drain hole 42. In an alternate embodiment and dependent upon the internal diameter of the drain hole, the valve stem 61 may still be within the drain hole. For example, as shown in FIG. 5B, intermediate detents may be provided along the cam surface to hold particular position(s) of the valve stem relative to the drain hole, and to finely adjust the rate of flow from the filling chamber to the reservoir. With the valve in a fully closed position (FIG. 5A), the cam follower is at the bottom of the helical cam 68, whereat the outer diameter of the valve stem contacts the perimeter of the drain hole 42 to completely occlude the drain hole. As shown in FIG. 5A, a tapered tip 621 may be formed at the bottom distal end of the valve stem 61 to achieve a tight seal against a corresponding valve seat 622 in the filling tube. This position is useful to enable filling of the filling chamber without allowing flow from the filling chamber.

Figure 4A:
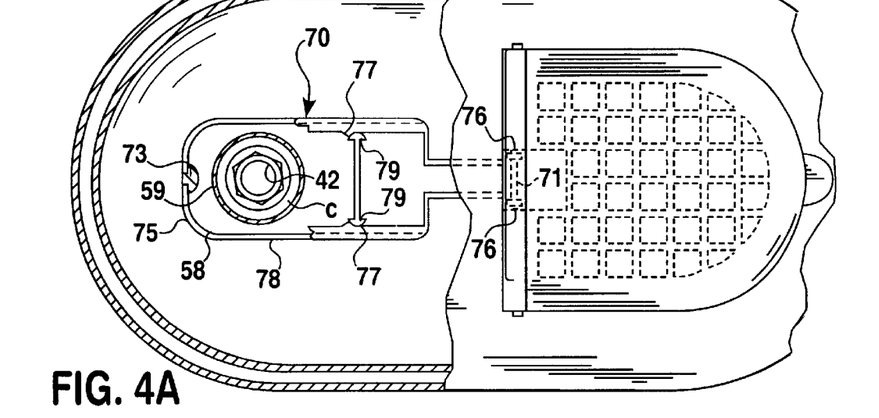
FIG. 4A is a partially broken away top view of the automated brewing machine of FIG. 1 with the lid in a closed position.
Figure 4B:
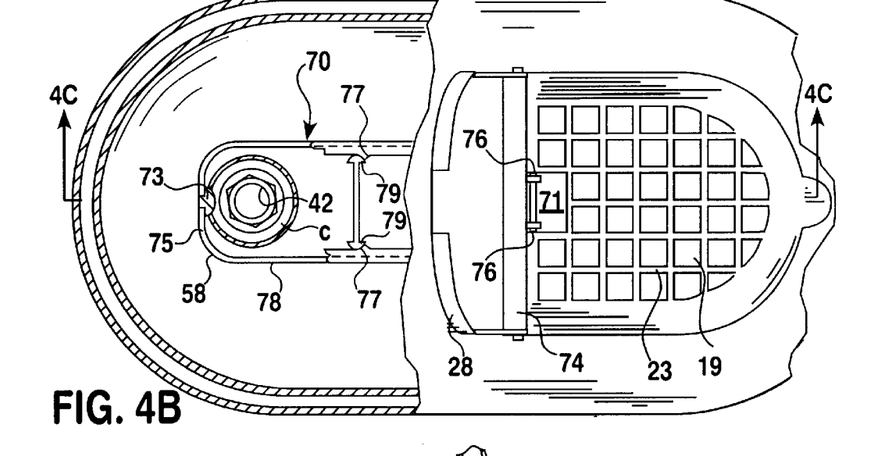
FIG. 4B is a partially broken away top view of the automated brewing machine of FIG. 1 with the lid in an open position.
Figure 4C:
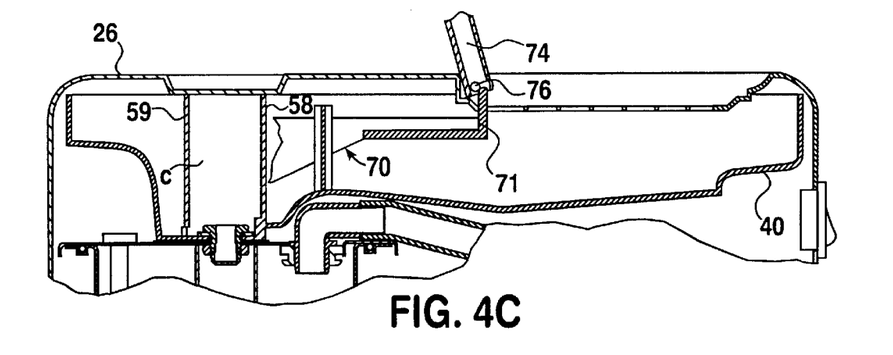
FIG. 4C is a cross-sectional side elevation of the upper portion of the brewing machine of FIG. 1 with the lid in an open position.

Water introduced into the filling chamber through opening 19 (which may include a grid 23, as shown in FIG. 4B) travels to the lowest point which is surrounded by the flow control chamber 58, flows through the opening 59, through openings in the vertical wall portions of the pin valve guide 64, past the valve stem 61, through the drain hole 42 into the reservoir 30. The position of the valve stem relative to the drain hole, and the relative diameters valve stem and the drain hole 42 determines the rate of flow of water into the reservoir. The rate of flow of water into the reservoir in turn dictates the rate of flow of water into the brewing chamber, the rate of the brewing operation, and ultimately the content and quality of the brewed beverage.

Figure 6A:
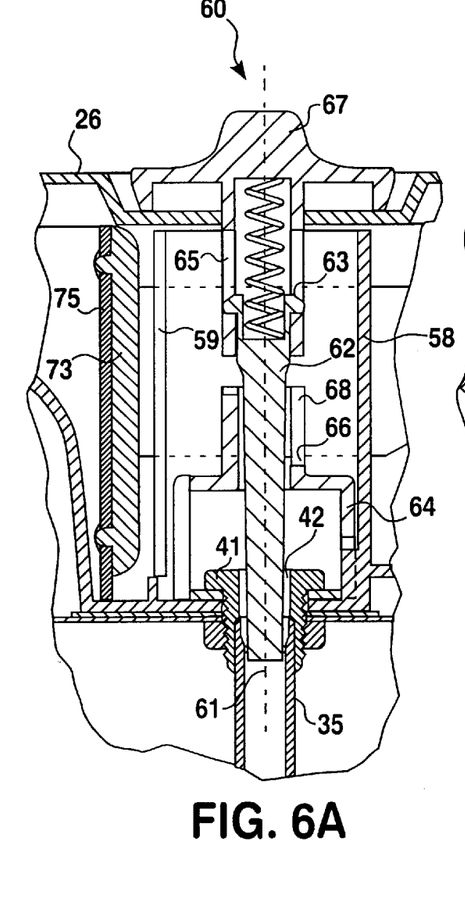
FIGS. 6A and 6B are cross-sectional views of an alternate embodiment of the brewing water flow rate control valve assembly of the invention, respectively showing the valve in different positions.
Figure 6B:
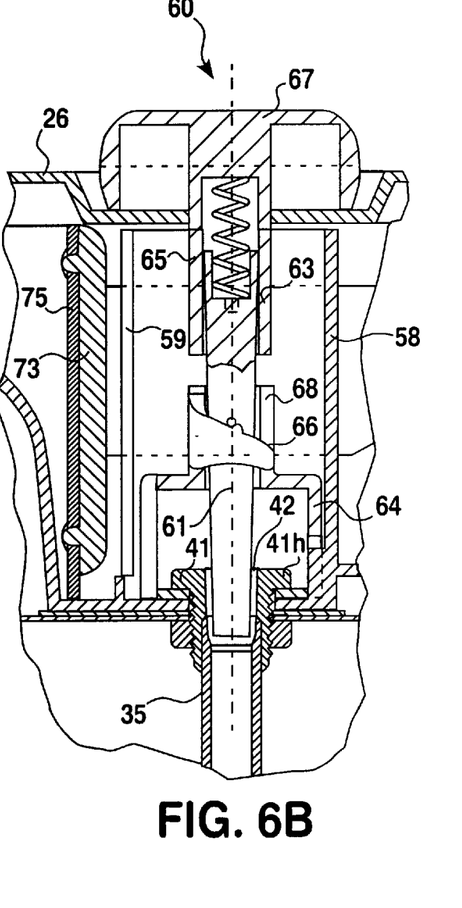
Figure 6C:
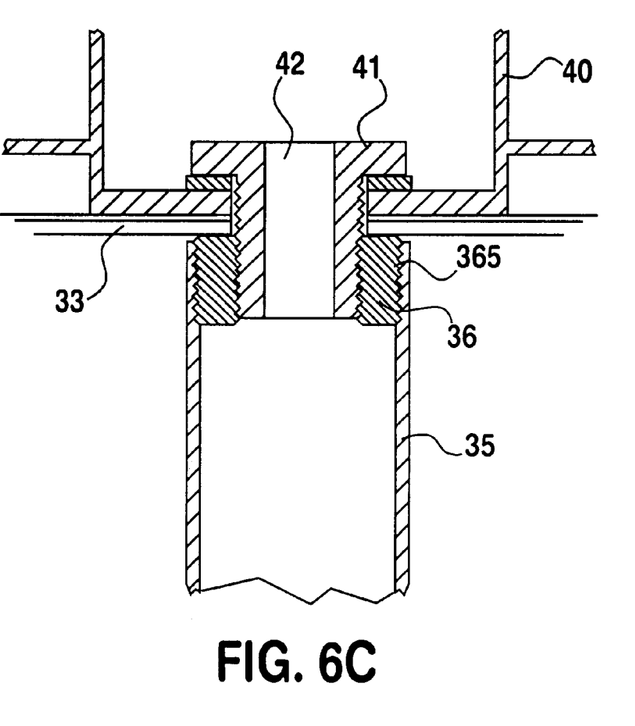
FIGS. 6C and 6D are cross-sectional views of alternate embodiments of reservoir fill tube interconnection with a filling chamber drain fitting.
Figure 6D:
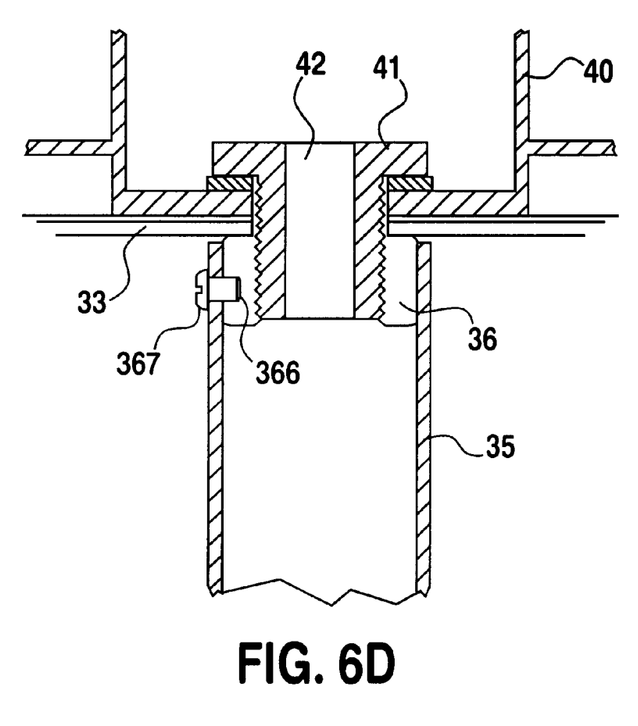

FIGS. 6A and 6B illustrate an alternate embodiment of the pin valve assembly 60 wherein the valve stem 61 is only slightly tapered and dimensioned so that it can pass completely through the drain hole (as in FIG. 6A) for a reduced flow rate decaffeinated setting, and retract nearly out of the drain hole in a faster flow rate caffeinated or regular setting (as in FIG. 6B). This embodiment of the pin valve assembly is used in combination with a separate control chamber flow valve assembly as described below, since the valve stem does not completely occlude the drain hole.

The invention further provides a separate mechanism for controlling flow from the filling chamber into the control chamber 58. As best shown in FIGS. 3 and 4A–4C, a control chamber flow valve assembly includes yoke 70 slidably mounted about the flow control chamber 58 within the filling chamber. A distal end 71 of the yoke is articulably attached to a hinged side 74 of dust lid 28. On an opposite end 75 of yoke 70 is mounted a seal 73 configured for sealing engagement with the opening 59 in flow control chamber 58 as yoke end 75 is drawn toward flow control chamber 58. As the lid 28 is opened, hinge seats 76 are moved in the arcuate path indicated on FIG. 3, thereby drawing the seal 73 into seating engagement with opening 59 in the flow control chamber 58. Chocks 77 on the interior of the yoke sidewalls 78 are deflected past complimentary chocks 79 formed or attached to the filling chamber floor inside the yoke to hold the yoke in the position with the seal engaged. Thus, in addition to the leverage of the lid in the open position, drawing the seal 73 against the opening 59, the yoke is chocked in place to ensure integrity of the seal as the filling chamber is filled. With the flow control chamber thus sealed off, no water can reach the drain hole 42 from the filling chamber, regardless of the setting of the pin valve.

Figure 7A:
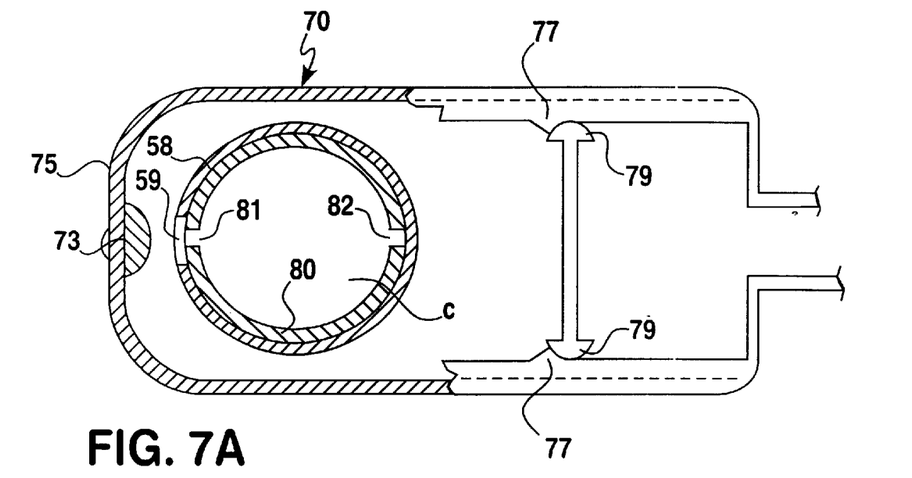
FIG. 7A is a top view of an alternate embodiment of a combined brewing water flow control and flow rate valve of the invention.
Figure 7B:
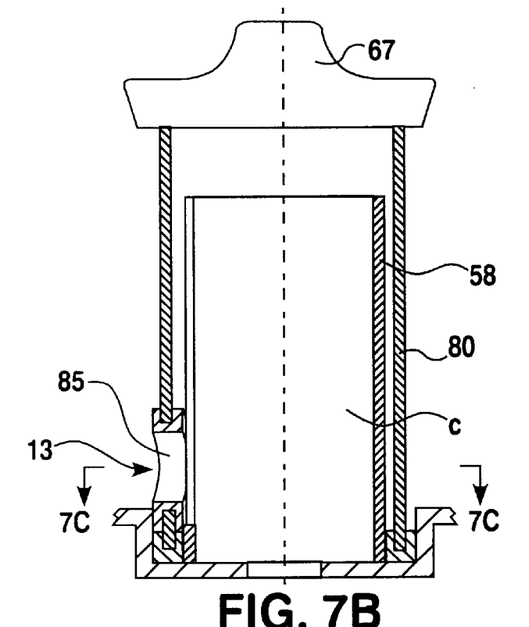
FIG. 7B is a side cross-sectional view of an alternate embodiment of a flow rate valve structure of the invention.
Figure 7C:
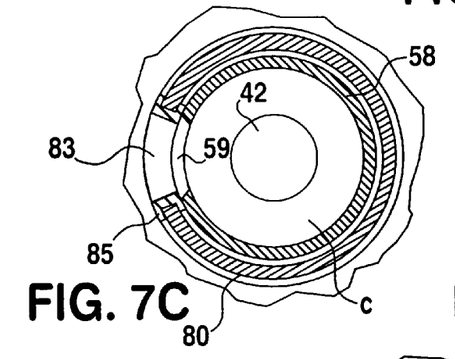
FIG. 7C is a top cross-sectional view of the flow rate valve structure of FIG. 7B in a fully opened position.
Figure 7D:
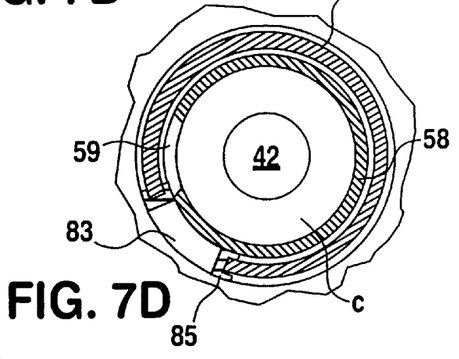
FIG. 7D is a top cross-sectional view of the flow rate valve structure of FIG. 7B in a partially closed position.

It will be appreciated that the control chamber could be alternately configured in any manner which forms a separate chamber within the filling chamber and about the drain hole; and that the shape and size of the opening in the control chamber can also be alternately configured and adjusted. For example, as shown in FIG. 7A, a cylindrical valve element 80 with openings 81 and 82 can be rotatably mounted within the control chamber 58, with a top end of the cylinder connected to dial 67. Flow into the control chamber is allowed upon alignment of the either of openings 81 or 82 with opening 59 in the control chamber. One of the openings 81 or 82 may be relatively smaller in size to provide a reduced flow rate into the control chamber such as required for brewing of decaffeinated coffee. When neither of the openings is aligned with the opening 59, flow into the control chamber is precluded. As further shown in FIG. 7A, this embodiment of a control chamber flow rate valve can be optionally combined with a control chamber flow valve assembly having the straddling yoke 70 and seal 73 as described above.

Figure 7E:
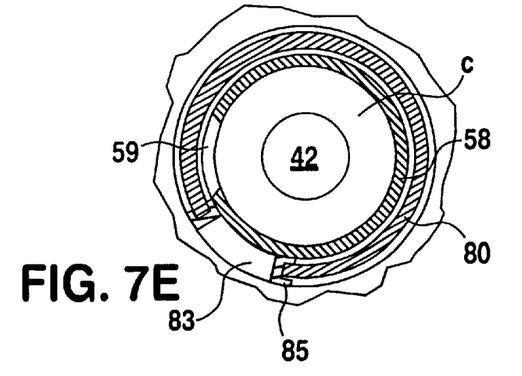
FIG. 7E is a top cross-sectional view of the flow rate valve structure of FIG. 7B in a completely closed position.

As shown in FIGS. 7B–E, a flow rate control valve can be alternatively configured with cylindrical valve element 80 outside of the control chamber 58, with a single opening 83 (such as a circular port near the bottom of valve element 80, surrounded by a gasket 85) positionable relative to opening 59 to be fully aligned/opened (FIG. 7C), partially aligned/opened (FIG. 7D), or unaligned/closed (FIG. 7E).

Figures 9A, 9B, 9C:
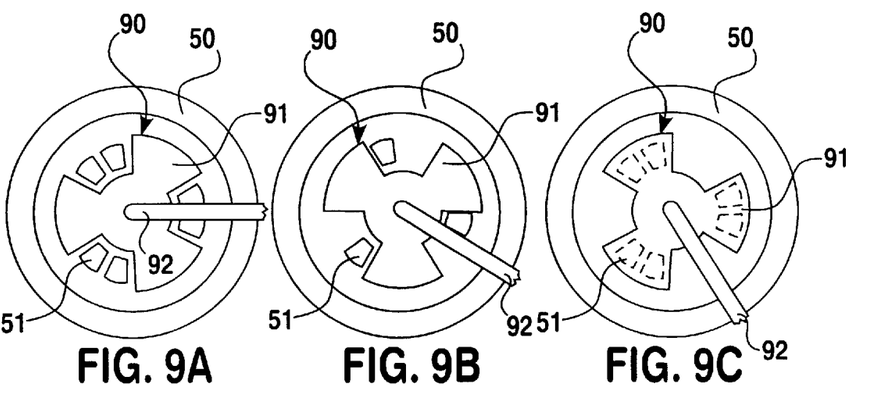
FIGS. 9A–9C are top views of the flow rate control portion of an adjustable flow rate brew basket showerhead of the invention.

The invention further provides an integral means of adjusting the rate of flow of heated water through the showerhead drain holes 51 into the brewing basket 24. As shown in FIGS. 9A–9C, a bladed disc valve 90 is rotatably mounted at the axial center of a generally annular array of radially spaced showerhead drain holes 51, with the blades 91 dimensioned to cover alternate drain holes, or to lie between the drain holes. The disc valve 90 is selectively rotated to a desired flow rate setting by, for example, attachment to a radially extending valve adjustment arm 92 (like that shown in FIG. 10A), which may extend through body 12 at the front of the machine. A regular or fast flow rate at the showerhead is provided with the disc valve in the position shown in FIG. 9A, i.e., not occluding any of the showerhead drain holes 51. A partially restricted decaffeinated flow rate is provided with the disc valve in the position shown in FIG. 9B. And a fully restricted complete flow stop is accomplished with the disc valve in the position shown in FIG. 9C.

Figure 10A:
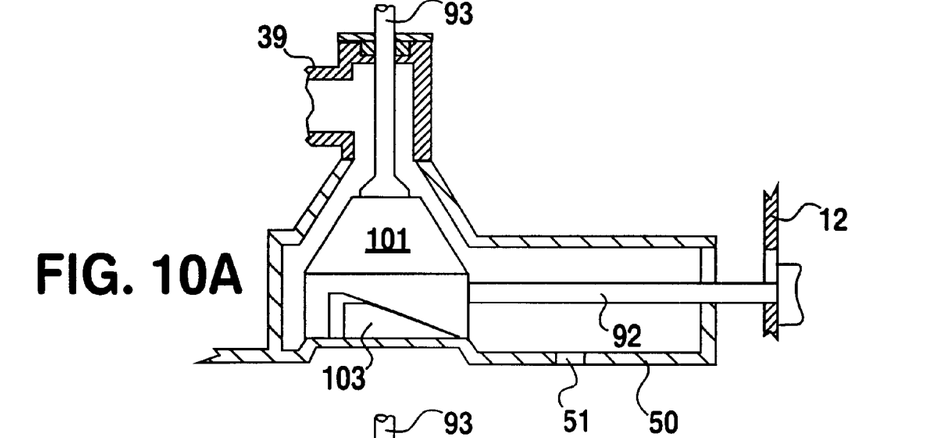
FIGS. 10A–10C are cross-sectional views of an adjustable flow rate brew basket showerhead of the invention.
Figure 10B:
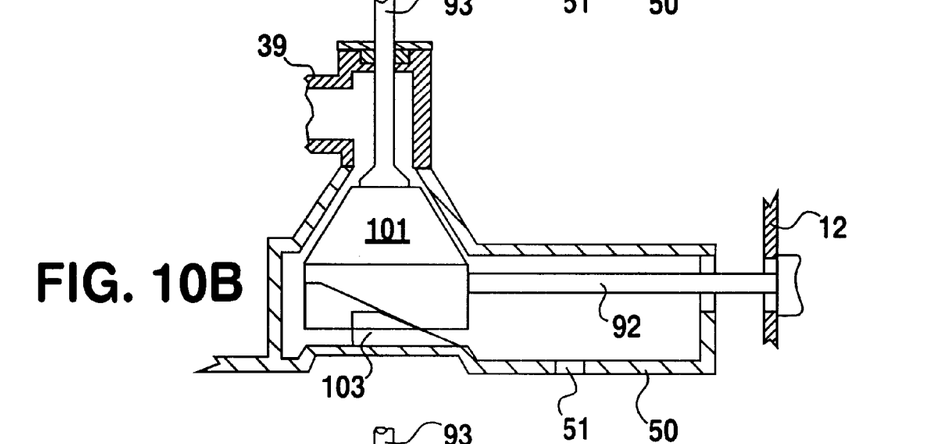
Figure 10C:
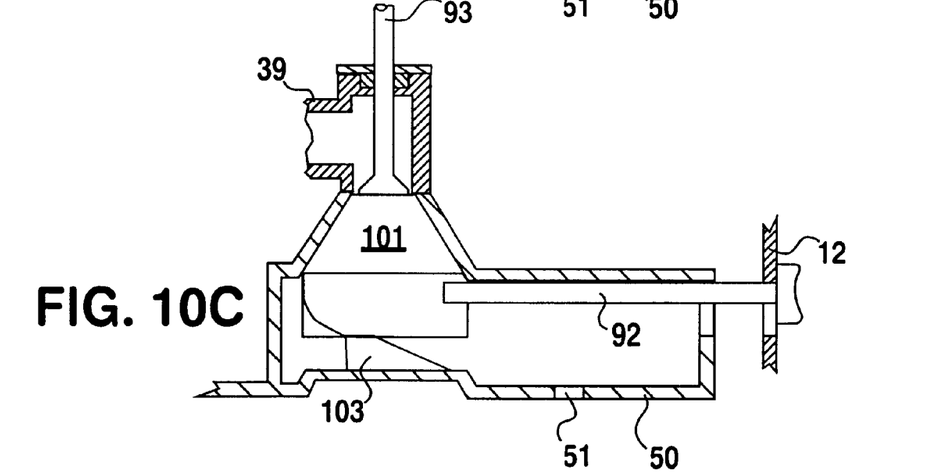

As shown in FIGS. 10A–10C, an adjustable flow rate showerhead can also be configured generally as a conical-type valve element 101 which is adjustable upon a cam 103, relative to an internal valve seat 105 which overlies the interior side of the showerhead 50. Maximum flow rate is provided with the conical valve element 101 at the lowest point on cam 103, as shown in FIG. 10A. A reduced flow rate through the showerhead is provided with the conical valve element in the position shown in FIG. 10B. And flow through the showerhead is completely blocked with the conical valve element 101 at the uppermost point on cam 103, as shown in FIG. 10C. The conical valve element 101 can be axially rotated upon the cam by a laterally extending valve adjustment arm 92, or an axially extending valve adjustment stem 93.

Figure 11A:
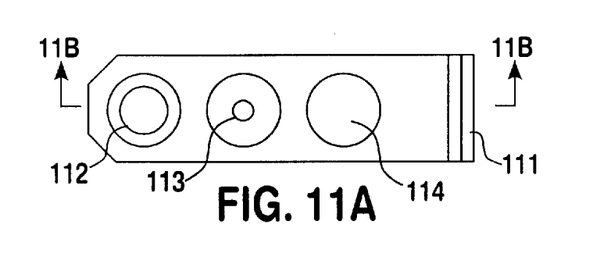
Figure 11B:
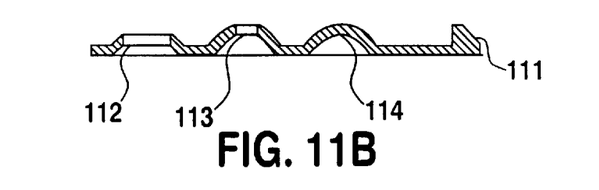
Figure 11C:
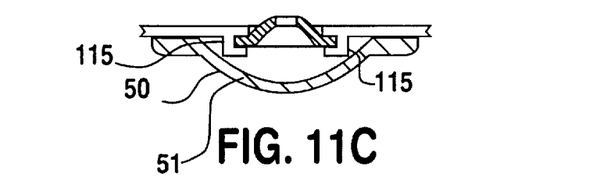

FIGS. 11A–11C illustrate another embodiment of an adjustable showerhead flow rate control mechanism which employs a single linear translating valve piece 110 with at least three different flow settings 112, 113 and 114. As shown in FIG. 11C, the linear valve piece 110 is slidably mounted in opposing tracks 115 which intersect the flow passage from conduit 39 to the showerhead. An adjustment tab 111 is provided to extend, for example, through the front wall of body 12, similar to adjustment arm 92 shown in FIG. 10A. The valve piece 110 is linearly translated to position the desired opening 112, 113, or flow stop 114 in alignment with the flow passage to the showerhead to thereby adjust the flow rate to the showerhead. Since the rate of flow at the showerhead directly affects the overall flow and brewing rate, the showerhead flow rate is set according to the beverage desired such as regular or decaffeinated coffee. Also, the ability to completely stop flow at the showerhead protects the brewing chamber from residual drip or vapor. The described showerhead flow rate control mechanisms can be used separately or in combination with the other flow and flow rate control mechanisms of the invention.

It will further be appreciated that although described in combination, either of the two flow control and flow rate control mechanisms of the flow control chamber or the adjustable valve assembly can be employed either individually or in combination in any multiple chamber apparatus where these types of flow controls are needed. Specifically, in the context of a displacement type brewing machine as described, in operation a charge of brewing water is introduced into the filling chamber through the opening in the cover, with the lid in an open position which seals the opening in the control chamber so that the water remains in the filling chamber. The pin valve assembly is set by the control knob to an open/flow position such as the fully opened position which may be marked on the cover as "Regular" and aligned with a pointer on the dial. When the lid is closed, and the seal disengaged from the opening in the control chamber, the water in the filling chamber is then free to enter the control chamber, pass the valve stem and valve guide, and drain through the drain hole into the reservoir. Alternatively, the pin valve may be set to a closed position, in which case sealing of the opening in the control chamber is not needed to stop flow into the reservoir. A second charge of brewing water may be required to completely fill the reservoir in the case where the capacity of the filling chamber is less than that of the reservoir. With sufficient water in the reservoir, the heat source to the reservoir is energized and the water heated to an adequate brewing temperature, as regulated by the thermostat.

When a batch of brewed beverage is desired, a brewing material such as coffee grounds is placed in the brewing chamber within a filter, and the brewing chamber repositioned in the flow path from the reservoir and over the carafe. The flow rate control valve is then set to the desired flow rate dependent upon the type of beverage to be brewed, such as regular or decaffeinated coffee. The rate of flow of the showerhead is also set according to the desired beverage. The lid is opened and a quantity of brewing water approximately equal to the amount of brewed beverage desired is poured into the filling chamber. When the lid is closed, this water flows into the reservoir, to the bottom of the reservoir as directed by the reservoir fill tube, displacing the heated water in the reservoir out of the reservoir, to the showerhead, and into the brewing chamber, where it passes through the brewing material in the brewing chamber and into the carafe. The water newly introduced to the reservoir is heated to the brewing temperature.

What is claimed is:

1. A flow control structure and seal mechanism for use at a fluid connection interface between two or more fluidly connected chambers to control flow of a liquid from a first chamber to a second chamber, the structure and mechanism comprising: a separate flow control chamber structure inside a first chamber, the flow control chamber structure constructed about an opening to a fluid connection between the first chamber and the second chamber, an opening in a wall of the flow control chamber to an interior of the first chamber, and a moveable seal engageable with the opening in the wall of the flow control chamber so as to seal and isolate said control chamber from said first chamber, the moveable seal engageable and disengageable with the opening in the wall of the flow control chamber according to movement of an access panel to the first chamber.

2. A flow control and flow rate assembly and structure for use between first and second fluidly connected chambers, to control flow and rate of flow between the first and second chambers, the assembly and structure comprising:
   an independently adjustable valve disposed within the first chamber;
   a yoke disposed within the first chamber; and
   a sealable control chamber disposed within the first chamber about a second opening in the first chamber leading to the second chamber, wherein the control chamber has a first opening to the first chamber which is selectively sealable by a seal which selectively seals flow from said first chamber to said independently adjustable valve, the seal being operable by the yoke in response to movement of a lid carried by said assembly and structure to isolate said control chamber from said first chamber, the second chamber being sealable by the independently adjustable valve having a valving element proximate the second opening.

3. The flow control and flow rate assembly and structure of claim 2 wherein the seal completely occludes the first opening and seals the sealable control chamber from the first chamber when actuated by the yoke.

4. The flow control and flow rate assembly and structure of claim 2 wherein the control chamber is sealed in response to operation of the lid, so that the control chamber is sealed from the first chamber when the lid is in an opened position.

5. The flow control and flow rate assembly and structure of claim 2 wherein the independently adjustable valve is a pin valve having a pin shaft which is moveable relative to the second opening and the movement of the pin shaft is independent of the actuated movement of the seal.

6. The flow control and flow rate assembly and structure of claim 5 wherein the pin shaft is moveable to completely occlude the second opening.

7. The flow control and flow rate assembly and structure of claim 2 wherein the lid is connected to the first chamber, and wherein the lid is connected to the seal by the yoke.

8. A flow control and flow rate assembly and structure for use between first and second fluidly connected chambers, to control flow and rate of flow between the first and second chambers, the assembly and structure comprising:
   a control chamber within the first chamber;
   a first opening from the control chamber to the first chamber;
   a seal selectively sealing the first opening;
   a linkage operating the seal in response to movement of a member on the first chamber;
   a second opening from the control chamber to the second chamber; and
   an independently adjustable valve selectively sealing the second opening to control flow from said control chamber to said second chamber and wherein said seal selectively seals flow from said first chamber to said independently adjustable valve.

9. The flow control and flow rate assembly and structure of claim 8, said member comprising a lid connected to the first chamber and connected to the linkage, wherein the operation of the lid causes the linkage to cause the seal to seal the first opening, thus sealing the control chamber from the first chamber.

10. The flow control and flow rate assembly and structure of claim 8 wherein the independently adjustable valve is a pin valve having a pin shaft which is movable relative to the second opening, wherein the movement of the pin shaft is independent of the actuated movement of the seal.

11. The flow control and flow rate assembly and structure of claim 10 wherein the pin shaft is movable to completely occlude the second opening.

12. The flow control and flow rate assembly and structure of claim 8 wherein the seal may completely occlude the first opening, thus sealing the control chamber from the first chamber.

* * * * *